(12) United States Patent
Lemoine et al.

(10) Patent No.: US 11,041,562 B2
(45) Date of Patent: Jun. 22, 2021

(54) PIVOT FOR A PLAIN BEARING AND GEARSET WITH REDUCED THERMAL STRESS

(71) Applicant: SAFRAN TRANSMISSION SYSTEMS, Colombes (FR)

(72) Inventors: Julie Marie Renée Lemoine, Moissy-Cramayel (FR); Alexis Claude Michel Dombek, Moissy-Cramayel (FR); Balint Pap, Moissy-Cramayel (FR)

(73) Assignee: SAFRAN TRANSMISSION SYSTEMS, Paris (FR)

( * ) Notice: Subject to any disclaimer, the term of this patent is extended or adjusted under 35 U.S.C. 154(b) by 0 days.

(21) Appl. No.: 16/646,646

(22) PCT Filed: Sep. 12, 2018

(86) PCT No.: PCT/FR2018/052237
§ 371 (c)(1),
(2) Date: Mar. 12, 2020

(87) PCT Pub. No.: WO2019/053374
PCT Pub. Date: Mar. 21, 2019

(65) Prior Publication Data
US 2020/0271217 A1 Aug. 27, 2020

(30) Foreign Application Priority Data
Sep. 12, 2017 (FR) ...................... 1758422

(51) Int. Cl.
*F16H 57/08* (2006.01)
*F01D 25/16* (2006.01)
(Continued)

(52) U.S. Cl.
CPC ........... *F16H 57/08* (2013.01); *F01D 25/166* (2013.01); *F02C 7/36* (2013.01); *F16C 17/02* (2013.01);
(Continued)

(58) Field of Classification Search
None
See application file for complete search history.

(56) References Cited

U.S. PATENT DOCUMENTS

| | | | | |
|---|---|---|---|---|
| 6,964,155 B2 * | 11/2005 | McCune | ................... | F02C 7/36 384/297 |
| 8,574,118 B2 * | 11/2013 | McCune | ................... | F02C 7/32 475/331 |

(Continued)

FOREIGN PATENT DOCUMENTS

| | | |
|---|---|---|
| EP | 2 607 695 A1 | 6/2013 |
| FR | 2 991 421 A1 | 12/2013 |
| WO | WO 2016/149814 A1 | 9/2016 |

OTHER PUBLICATIONS

International Patent Application No. PCT/FR2018/052237, International Search Report and Written Opinion dated Dec. 19, 2018, 19 pgs.

*Primary Examiner* — Dirk Wright
(74) *Attorney, Agent, or Firm* — Lathrop GPM LLP

(57) ABSTRACT

The invention relates to a pivot pin (5) for an epicyclic gear train sliding bearing, the pivot pin having axially opposed, laterally open circumferential grooves (25*a*), providing flexibility to the pivot pin and which radially separate two axially opposite lateral end portions of a central shank from two lateral cantilevered portions (27*a*,27*b*) of the pivot pin. At least one of the cantilevered lateral portions is hollowed out by at least one recess (65*a*).

19 Claims, 4 Drawing Sheets

Figure 1:
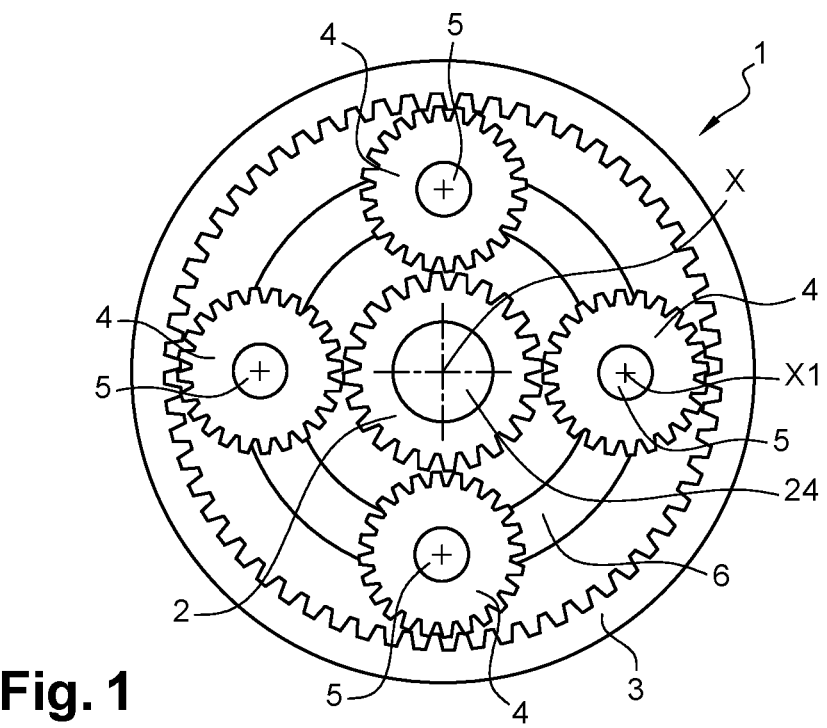

(51) Int. Cl.
*F02C 7/36* (2006.01)
*F16C 17/02* (2006.01)
*F16H 57/04* (2010.01)

(52) U.S. Cl.
CPC ....... *F16H 57/043* (2013.01); *F16H 57/0479* (2013.01); *F16H 57/0486* (2013.01); *F05D 2260/40311* (2013.01); *F16C 2361/61* (2013.01); *F16H 2057/085* (2013.01)

(56) References Cited

U.S. PATENT DOCUMENTS

| | | | |
|---|---|---|---|
| 8,690,721 B2 * | 4/2014 | McCune | F16H 57/0479 475/159 |
| 9,982,771 B2 * | 5/2018 | Muldoon | F16H 57/0479 |
| 10,494,998 B2 * | 12/2019 | McCune | F02C 7/06 |
| 10,851,671 B2 * | 12/2020 | Simard-Bergeron | F16C 17/02 |

* cited by examiner

Art Antérieur

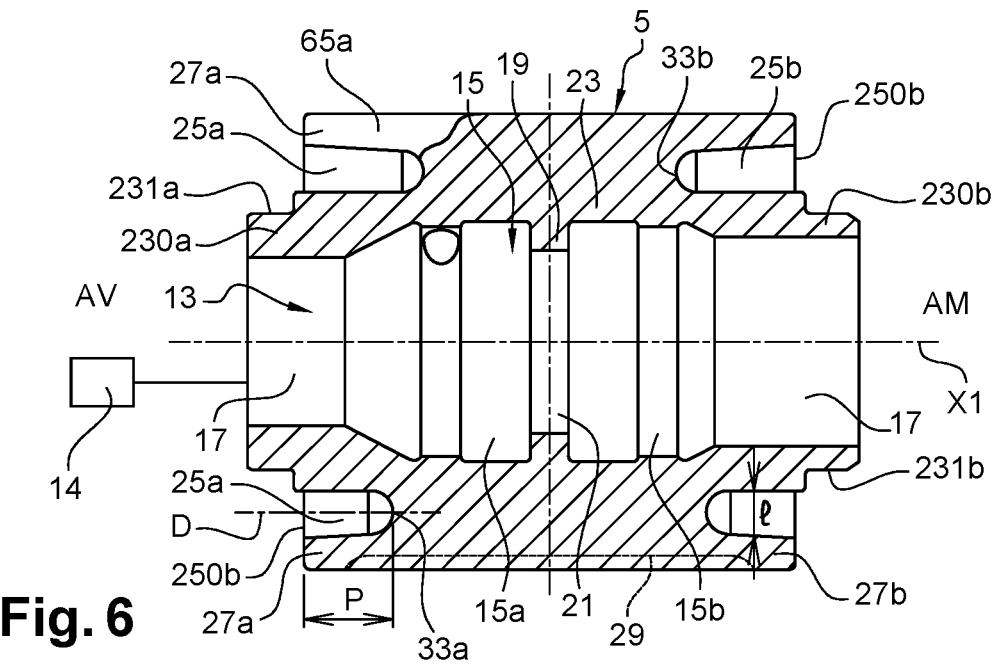
Fig. 6
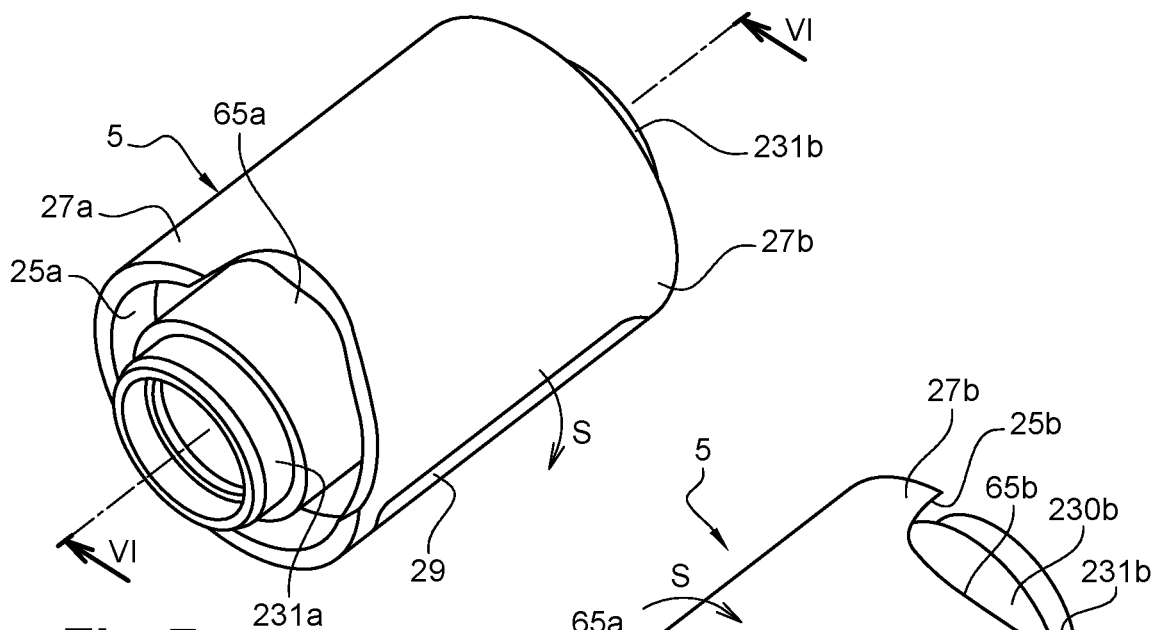
Fig. 7
Fig. 8

PIVOT FOR A PLAIN BEARING AND GEARSET WITH REDUCED THERMAL STRESS

CROSS-REFERENCE TO RELATED APPLICATIONS

This application is a 35 U.S.C. § 371 filing of International Application No. PCT/FR2018/052237 filed Sep. 12, 2018, which claims the benefit of priority to French Patent Application No. 1758422 filed Sep. 12, 2017, each of which is incorporated herein by reference in its entirety.

The present invention relates to a sliding bearing pivot pin and one planetary gear, in particular for an aircraft gas turbine engine, equipped with at least one such pivot pin.

In the present application:

axial means parallel to the axis of rotation X about which the so-called turning blades of the concerned turbine engine are mounted in rotation, radial means perpendicular to the axis X, circumferential means extending about the axis X, external and internal (or outer and inner) respectively mean radially externally and radially internally relative to the axis X, recess is synonymous with indentation, notch, cut-out, cavity, hollow. It is a space without matter.

A planetary gear train is an aimed application, including an epicyclic planetary gear train which comprises an outer ring gear and planet pinions engaged with the central pinion and with the outer ring gear each mounted so as to be free to rotate on a planet carrier, with the planet pinions each being able to rotate about a planet axis through one pivot pin.

Among all the epicyclic planetary gear trains are notably concerned:

those in which the outer ring gear (a mounting also called epicyclic reducing gear) is mobile in rotation, but also those in which the planet carrier is fixed and the outer ring gear (a mounting also called planetary reducing gear) is mobile.

The planet carrier is fixed or able to pivot about the axis of the inner sun gear and the outer sun gear. The entry can be formed by the inner sun gear and the exit by the planet carrier.

In an aircraft gas turbine engine, epicyclic gear trains are used in particular as speed reducers for reducing the speed of rotation of the fan rotor, regardless of the rotational speed of the turbine.

The document FR 2,991,421 describes such an epicyclic reducing gear, wherein the sprocket wheels forming the planet gears are mounted on pivot pins of the planet carrier by means of sliding bearings, which is advantageous, in terms of space requirements and weight. Their service life is almost infinite, so long as they are continuously supplied with oil and the oil includes no abrasive particle.

This sensitivity to lubrication means that the deformation of the bearing on the pivot pin side and its temperature must be checked.

However, during TEHD (thermo-elasto-hydro-dynamic) calculations on a pivot pin for a conventional sliding bearing, heating of the active surface of the pivot pin (radially outer surface forming part of the bearing once the pivot pin is mounted between the satellite and the satellite carrier) was observed, in particular in a zone located circumferentially just upstream of the passage, such as a slot, for supplying oil to said active surface of this pivot pin.

However, non-identical misalignments were observed between the upstream bearing seatings and the downstream bearing seatings of different pivot pins. Tangential displacements, due to applied torques, and/or radial displacements, due to centrifugal force, and not symmetrical between upstream and downstream along the axis of rotation X, were observed on pivot pins.

This is damaging as it can affect the reliability of the pivot pin and the efficiency of the bearing.

One of the aims of the invention is to provide a simple, effective and economical solution to at least part of these problems.

For this purpose, it offers a pivot pin (also called a shaft) for the sliding bearing of a gear train, with the pivot pin having:

a portion forming a central shank extending around an axial passage of the pivot pin, and axially opposed circumferential grooves, which are open axially (i.e. laterally, thus providing flexibility to the pivot pin) and which radially separate two axially opposed lateral end parts of the central shank from two cantilevered lateral portions of the pivot pin, the pivot pin being characterized in that at least one of the cantilevered lateral portions is hollowed out by at least one recess.

By thus providing a recess, viz. a void, on at least part of at least one of the zones of flexibility formed by the cantilevered lateral portions, the distribution of the material in the pivot pin with respect to a pivot pin with cantilevered lateral portions which are uniformly solid and circumferentially identical will be modified, it being recalled that these circumferential zones of flexibility make it possible to reduce the rigidity of the pivot pin in order to limit the misalignment between the active surface of the pivot pin and its bearing seatings.

However, the need for flexibility has proven not to be necessary in all directions. It is therefore possible to vary locally the stiffness of its flexible zones, especially in areas of high heating, in order to increase conduction and thus reduce the temperature of the active zone, without altering the quality of the above-mentioned alignment. One cause of the above-mentioned local temperature increase was found to be related to the presence of trapped air in the zone of flexibility. The proposed solution addresses this. The absence of matter limits the conduction of heat and therefore the evacuation of calories.

Tests and measurements have confirmed that the predetermined deformation of the pivot pin provided by the above-mentioned zones of flexibility can even be locally eliminated:

that, on the lateral side of said at least one recess, said lateral cantilevered portion is circumferential but not annular, and/or that said at least one recess is present at the interface between a planet pinion and the pivot pin under consideration, on the smooth surface of the pivot pin which defines the outer circumferential surface of this pivot pin.

Therefore, in order to further promote these heat transfers and the efficiency in the anti-misalignment effect, it is furthermore recommended that the above-mentioned pivot pin should be in one piece, with its cantilevered lateral portions and its central shank being in one piece.

And in order to optimise the expected decrease in temperature of the active zone, without altering the quality of the above-mentioned alignment, it is proposed:

that said at least one recess should have an irregular contour, and/or that, on the side of this recess:
  the circumferential groove should have, away from said at least one recess, at least one depth (P) in a direction in which the circumferential groove extends inwardly of the pivot pin, from a free side end of said cantilevered side portion to a bottom end, and
  said recess then should extend over at least 10% of the circumference of the pivot pin and/or said depth (P) of the circumferential groove.

Spreading this temperature control over the active area of the pivot pin, by providing that the pivot pin includes at least two recesses hollowed out respectively in one and the other of the two cantilevered lateral portions, will make it possible to widen the area at lower temperature and thus balance the stresses, even if the recesses on either side are different.

As regards the planetary gear train for an aircraft gas turbine engine, which is also concerned by the invention, now, it is provided that it will have an outer ring gear and planet pinions engaged with the central pinion and with the outer ring gear, and mounted so as to be free to rotate on a planet carrier, the planet pinions each being able to rotate about a planet axis (parallel to the axis X) through said above-mentioned pivot pin, with all or part of its characteristics.

It is also provided that this gear train may additionally include means for supplying oil to an interface between a said planet pinion and the pivot pin in question. At least one radially outer circumferential surface of a said pivot pin will then preferably have a slot for supplying a lubricating liquid, said width (I) and/or depth (P) being minimum in a lateral area of the pivot pin adjacent to the slot and located angularly on the side opposite that towards which the lubricant flows (direction S below) on the outer surface when the gear train is operational and hence can rotate.

In this way, material will have been removed locally in areas where the lubricant is very hot. Such a gear train is efficient in that it combines performance in the expected alignment of the parts concerned with a limitation of hot spots that are harmful both mechanically for the structure of the parts and for the lubricant.

As for the above-mentioned turbine engine, which is also concerned as such, it may comprise such a planetary gear train, specifically an epicyclic gear train, the central pinion of which can surround and be solidarized in rotation with the shaft of the turbine engine compressor.

In particular, this could be a case where the outer ring gear is solidarized with a casing or a static annular ring of the low-pressure compressor.

The invention is thus applicable, for example, to a planetary gear train, such as an epicyclic gear train in which the outer ring gear is fixed. In this case, the gear train can be qualified as a reducer since the output speed, i.e. that of the satellite carrier, is lower than the input speed, i.e. that of the rotating drive shaft of the central pinion.

The planet carrier can then, for example, be connected to a fan wheel upstream of the turbine engine, whose speed is thus lower than the speed of the compressor shaft.

Another aspect on which the invention intervened is the method for making a sliding bearing pivot pin.

Indeed, to the knowledge of the inventors until now, no method has ever been defined to obtain a good evacuation of calories, or even a favorable compromise between this evacuation and a scope always efficiently guided.

This is how it is proposed here a method for making the pivot pin above-mentioned with its outer circumferential surface having, as aforesaid, a supply slot for a lubricating liquid, so that the liquid flows on a circumferential side of said outer circumferential surface when it exits the supply slot, in which method:
  temperature fields of the pivot pin are determined by a TEHD model at least at the location of at least one of the cantilevered lateral portions,
  at least one zone is identified at this location that the TEHD model indicates as the highest temperature zone(s), and then
  a recess is created at the location of said area in said at least one cantilevered lateral portion.

This way of operating is fast, simple and reliable.

It is specified that the thermo-hydrodynamic method in the context of lubrication, known as THD, consists of determining the temperature fields in the lubricating fluid but also in the solids constituting the contact in conjunction with the hydrodynamic pressure field in the lubricating film. For this purpose, the Reynolds equation, whose main parameter is pressure, is associated with two additional equations: the energy equation which will make it possible to determine the temperature at any point in the fluid, and the Fourier equation which will make it possible to determine the temperature in solids (the shaft, connecting rod, bearing, etc.). The model is said to be thermo-elasto-hydro-dynamic, noted TEHD, when elastic and thermoelastic deformations are taken into account in addition to purely thermal phenomena in the overall solution of the problem. It goes without saying that thermal deformations of solids can only be taken into account if the temperatures in the solids are known.

Figure 5:
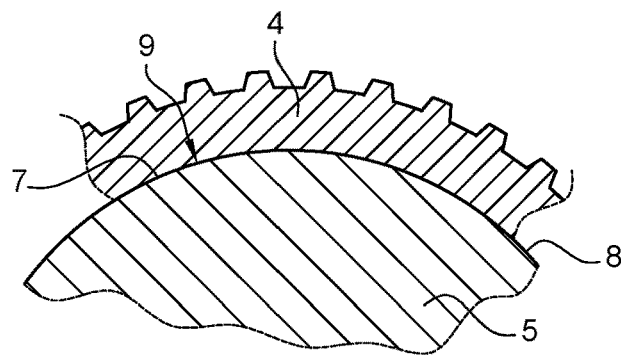
Figure 5:
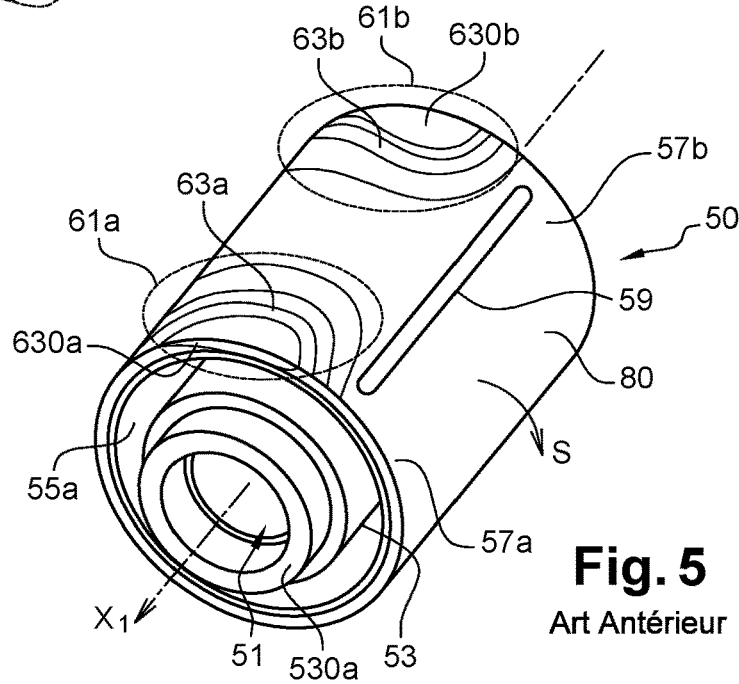
Figure 9:
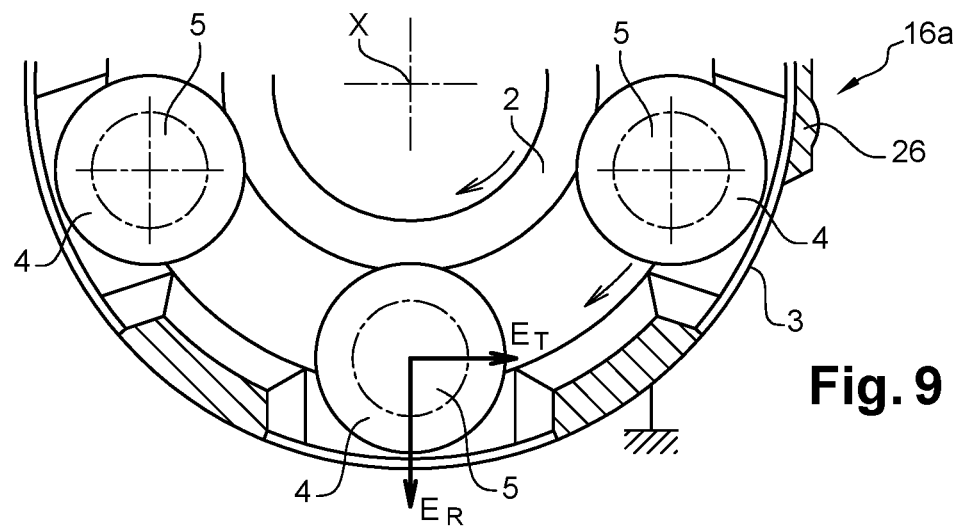
Figure 10:
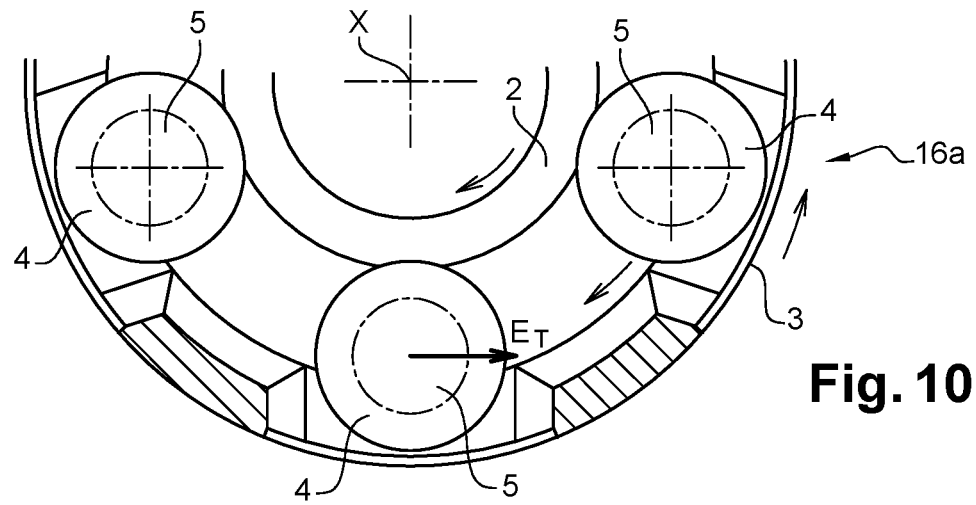
Figure 11:
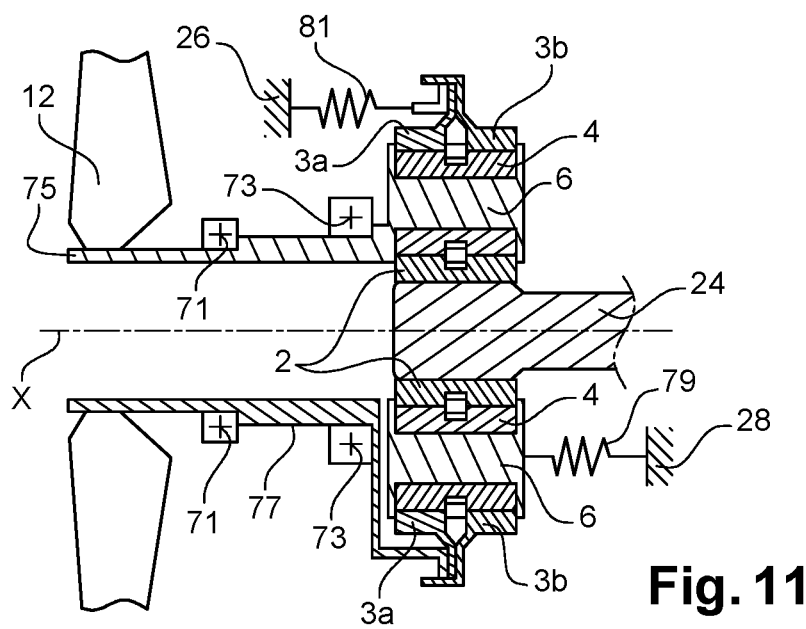

The invention will, if necessary, be better understood and other details, characteristics and advantages of the invention will become apparent upon reading the following description as a non-exhaustive example with reference to the appended drawings wherein:
  FIG. 1 is a front diagram of a planetary gear train,
  FIG. 2 is a kinematic diagram of an epicyclic gear train,
  FIG. 3 is a local sectional view of the sliding bearing,
  FIG. 4 is a longitudinal diagram of a turbine engine,
  FIG. 5 is a perspective view of a pivot pin of the prior art,
  FIG. 6 is an axial cross-sectional view along VI-VI of FIG. 7,
  FIGS. 7, 8 are two possible embodiments of a pivot pin according to the invention,
  FIG. 9 is a diagram of pivot pins mounting in an epicycloid configuration,
  FIG. 10 is a schematic diagram of pivot pins mounting in a planetary configuration, and
  FIG. 11 compares two epicyclic gear (top) and planetary (bottom) gear solutions.

Figure 2:
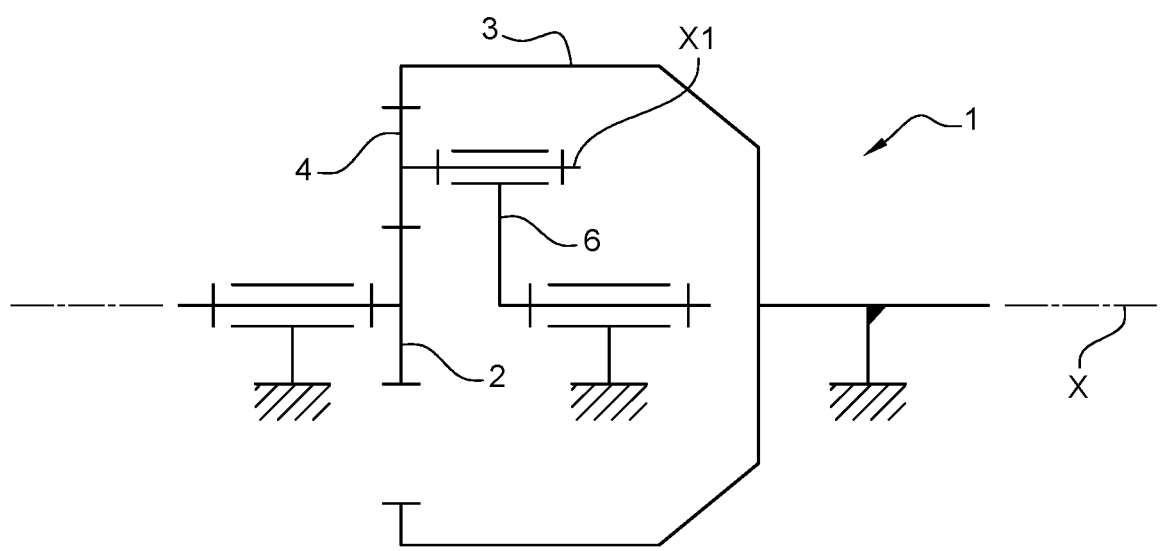
Figure 3:
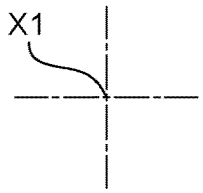

FIGS. 1 and 2 schematically illustrate the structure of an epicyclic reducing gear 1 on which the invention can be based. The reducing gear 1 typically includes an inner sun gear 2 (also called a sun gearing) and an outer sun gear 3 (also called an outer ring gear), the two sun gears being coaxial. The inner sun gear, or central pinion 2, can be movable in rotation around its X axis, while the outer sun gear 3, or outer ring gear, can be fixed, or vice versa. The planetary gear train 1 further comprises planet gears or planet pinions 4 mounted to be movable in rotation on pivot pins 5 of a planet carrier 6. Each planet gear 4 meshes with both the inner sun gear 2 and the outer sun gear 3. The planet carrier 6 is fixed or able to pivot pin about the axis X of the inner sun gear 2 and the outer sun gear 3. The inlet can be formed by the inner sun gear 2 and the outlet by the planet gear carrier 6.

The planet gear carrier 6 is for example coupled in rotation to an impeller (in the case of a turboprop) or a fan wheel (in the case of a turbojet engine).

Figure 4:
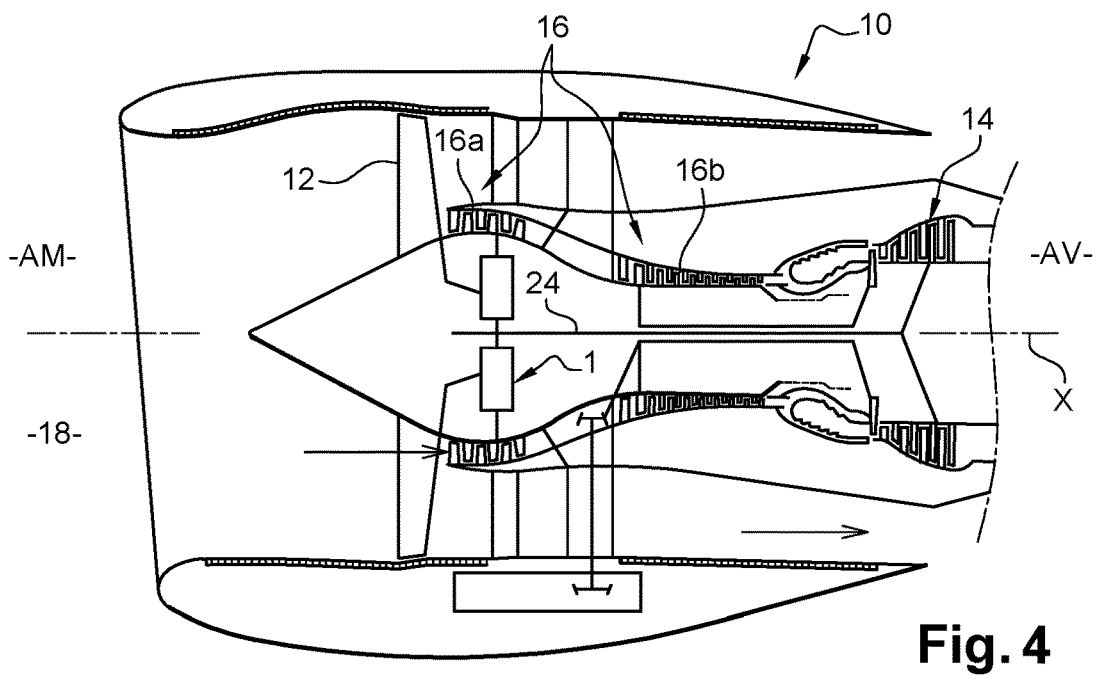

In an aircraft gas turbine engine 10, planetary gear trains 1 are more particularly used as speed reducers to reduce the rotational speed of a rotor, such as a blower 12 FIG. 4, independently from the rotational speed of at least one turbine 14 axially coupled downstream to at least one compressor 16 with which the turbine engine is also equipped. First the front air inlet 18, then the blower 12 and the compressor 16 are passed through by air.

The central pinion, or inner sun gear 2, surrounds and is then solidarized in rotation with the shaft 24 of the compressor 16, as illustrated for example in FIGS. 1,4. In particular, the planetary gear train 1 can be mounted in a radially formed annular enclosure inside a low-pressure compressor 16a arranged downstream of the blower 12 and upstream (AM) of a high-pressure compressor 16b.

As best seen in FIGS. 1 to 3, each planet gear 4 includes a cylindrical inner surface 7 mounted to pivot about a cylindrical surface 8 (the outer bearing seating surface of the pivot pin 5 corresponding to the planet carrier 6 so as to form a sliding bearing.

The interface 9 between the two cylindrical surfaces 7, 8 therefore must be supplied with oil. For this purpose, as shown in FIG. 6, the planetary gear 1 comprises lubricant supply means 13 connected to a lubricant source 13a and comprising a chamber 15 (51 FIG. 5), also called an axial passage, extending substantially along the axis X1 of the relevant pivot pin 5. At least one of the ends 17 of the chamber 15 is connected to an oil inlet channel. If only one of the ends 17 forms an oil inlet, the other end is plugged. The chamber 15 is globally cylindrical and more particularly comprises two parts 15a,15b (see FIG. 6) separated by a central partition wall 19 which extends radially. The lateral ends 17 of the chamber 15 are provided with axial passages having a smaller diameter than the chamber 15, with at least one such passage forming an oil inlet, as indicated above. A hole 21 providing communication between the portions 15a, 10b of the chamber 15 goes through the central wall 19. FIG. 5 shows a conventional pivot pin 50 which, like those 5 conforming to the invention (see FIGS. 6-9), has a (substantially) cylindrical outer surface (marked 80 for the pivot pin 50 and 8 for the pivot pin 5) of axis X1, adapted to form a sliding bearing with the (substantially) cylindrical inner surface (7 FIG. 3) of the relevant satellite pinion 4 of axis X1.

Each pivot pin respectively 5,50 has a part forming a radially central shank respectively 23,53, extending around the axial passage respectively 15,51. It is around the axis X1 that the pivot pin is adapted to rotate, in the direction S imposed by its mounting on the reducing gear. In addition, each pivot pin has axially opposite circumferential grooves respectively 25a,25b,55a, which are open axially (i.e. laterally), providing the pivot pin with flexibility (FIG. 5, the inside of the other end of the pivot pin is not visible, hence the only reference 55a mentioned). These circumferential grooves separate radially, from two lateral cantilevered parts respectively 27a,27b,57a,57b, two lateral end parts, respectively 230a,230b,55a (the other is not visible in FIG. 5), each with a circumferential bearing surface 231a,231b axially opposite the central shank.

The radially outer circumferential surface respectively 8,80 has an elongated feed passage, such as a slot, respectively 29,59, parallel to the axis X1 for the supply of lubricating liquid. This slot communicates with a radial duct (31, FIG. 8), which communicates with the above-mentioned axial passage 15,51. The liquid lubricant exiting passage 29,59 is considered to flow on the outer surface 8,80 in the S direction of FIGS. 5,7,8, when the epicyclic gear train 1 is operating.

On the pivot pin 50 of the prior art, heating of its active surface, and therefore of its outer surface 80 was observed, in particular circumferentially upstream of passage 59; zones 61a,61b FIG. 5.

It turns out that this local temperature increase is created by the air trapped in the soft zone (cantilevered lateral portions 57a,57b). The absence of matter limits the conduction of heat and therefore the evacuation of calories. As a reminder, the recess in the flexibility zone (circumferential grooves, such as 55a) reduces the rigidity of the pivot pin to reduce misalignment between the active surface of the bearing and its seatings. However, the need for flexibility is not necessary in all directions, so it is possible to limit the extent of the flexibility zone in areas of high temperature rise, in order to increase conduction and thus decrease the overall temperature on the outer circumferential surface 8,80.

This has led inventors to imagine the following methodology of approach to which the invention relates:

First, they have determined by a TEHD model and on a pivot pin such as the one referenced 50, temperature fields such as 63a,63b, at least at the location of at least one of the cantilevered lateral portions 57a,57b.

Next, they have identified at that (or each) location, at least one area that the TEHD model indicated as the area(s) of highest temperature(s), as in 630a,630b FIG. 5.

Then they have intervened on the pivot pin 5 of the invention so that it was made with at least one of the lateral cantilevered portions 27a,27b can be recessed by at least one recess 65a (FIGS. 6-7), 65a,65b FIG. 8; see locally interrupted portion 27a in the common example of FIGS. 6-7 and opposite locally interrupted portions 27a,27b in the other example of FIG. 8.

A recess area turns out to be a low stress area. It is therefore not or only slightly inconvenient that such hollows exist. The absence of material does not (noticeably) affect the guidance by the bearing seatings.

Before detailing this change, it should also be noted in FIG. 6 that, apart from the recess for the groove 25a, each circumferential groove 25a,25b has (which could also be seen on the pivot pin 50 of the prior art or the one in FIG. 6) a free lateral end, respectively 250a,250b, located at the corresponding free end of the cantilevered lateral portion 27a or 27b under consideration.

Each circumferential groove also has:

at least one depth P, in a direction (such as D FIG. 9 for the groove 25a) in which the circumferential groove extends inwardly of the pivot pin, from the free side end (such as thus 250a) to a bottom end, such as 33a (see also reference 33b for the groove 25b), and at least one width I (which can be considered as a section, or a diameter depending on the shape of the groove).

Roughly speaking, the direction (such as D) in which a circumferential groove extends is axial (parallel to the axis X1). More finely, a radial inclination of a few degrees inwards can be noted.

In any case, the modification which leads to the solution of the invention therefore comprises a fabrication of the pivot pin 5 such that at least one recess 65a,65b will have been created at (the) location(s) indicated, via the TEND model, as the zone(s), such as 630a and/or 630b, of the highest temperature(s) in said at least one lateral cantilevered part.

Since during operation, with the planetary gear train operational (gears able to rotate), the lubricant is assumed to flow in the S direction, out of the passage 29, on the radially outer circumferential surface 8, said at least one recess 65a,65b will be favourably adjacent to this slot and then located angularly on the side opposite that to which the lubricant flows (S direction) out of the passage 29; see two examples, FIGS. 7 and 8.

Therefore, in order to further promote these heat transfers and the efficiency in the anti-misalignment effect, it is furthermore recommended that the above-mentioned pivot pin should be in one piece, with its cantilevered lateral portions 27a,27b and its central shank 23 being in one piece.

Since the zone(s) of highest temperature, such as 630a and/or 630b, is (are) likely to be localized, it is expected that on the relevant side of recess 65a and/or 65b, the corresponding cantilevered lateral portion 27a and/or 27b will be circumferential but not annular, as shown in FIGS. 6-8. In this way, overheating and alignment can be combined in the best possible way.

In this respect, the or each recess 65a,65b shall extend favourably over at least 10% of the circumference of the pivot pin and/or said depth (P) of the circumferential groove 25a,25b under consideration.

In a first version, the pivot pin 5 may have a recess 65a or 65b only on one axial side of the pivot pin, here at the end, as shown in FIG. 7.

However, it is more likely that, as in a second version shown in FIG. 8, the pivot pin 5 will have at least two recesses 65a and 65b on both axial sides of the pivot pin.

FIGS. 9 and 11 (top) show again the case of a pivot pin assembly 5 in an epicyclic configuration, i.e. in a case where the central pinion 2 is mobile, but the outer ring gear 3 is fixed, solidarized with an outer casing or a static annular shell 26 of the compressor 16, in particular of the low-pressure compressor 16a, see FIG. 11 above where a spring connection 81 connects the annular shell 26 to one of the half-rings, here 3b. As illustrated, both tangential ET, due to the applied torque, and radial ER, due to the centrifugal force, efforts are exerted on each pivot pin 5.

In FIG. 10, another application case is shown, of a mounting of pivot pins 5 in a planetary configuration, i.e. in a case where both the central pinion 2 and the outer ring gear 3 are able to rotate around the axis X of the compressor 16a, in particular of the low-pressure compressor. As illustrated, tangential forces ET due to the applied torques, are exerted on each pivot pin 5. This situation can be that of an open-rotor or a double blower.

FIG. 11 compares solutions with epicyclic gear trains in which:

at the top, the figure shows a mobile planetary carrier and fixed-crown solution, at the bottom, the gear train is such that the planet carrier 6 is fixed (opposite a casing, or a static annular shell 28) and the outer ring gear is mobile (also called the planetary reducing train solution).

In connection with some of the previous figures, we find there in common a planet carrier 6 carrying planet gears 4, an inner sun gear 2 and an outer sun gear, here in two respectively upstream and downstream half rings 3a,3b with respect to the axis of rotation X. The internal sun gear 2 is engaged with the axial shaft 24, the shaft of the low-pressure compressor in the example. Bearings 71,73 support and axially guide the blower 12.

In the top solution, via an axial upstream extension 75 supported and guided by the bearings 71,73, the planet carrier 6 is engaged with the blower 12 and a fixed crown carrier is added, here connected to the upstream half crown 3a.

In the lower solution, the outer sun gear (half-rings 3a,3b) engages with the blower 12 via an upstream axial extension 77 supported and guided by the bearings 71,73. The planet carrier 6 is fixed (spring connection 79 with the static annular shell 28).

The invention claimed is:

1. A pivot pin for a planetary gear sliding bearing, the pivot pin having:
    a portion forming a central shank extending around an axial passage of the pivot pin having an axis, and
    axially opposed circumferential grooves, which are open laterally and which radially separate two axially opposed lateral end portions of the central shank from two axially opposite lateral cantilevered portions of the pivot pin,
    characterised in that at least one of the cantilevered lateral portions is hollowed out by at least one recess.

2. A pivot pin according to claim 1, which is in one piece, with its central shank and its cantilevered lateral portions being in one piece.

3. A pivot pin according to claim 1, wherein, on the lateral side of said at least one recess, said lateral cantilevered portion is circumferential but not annular.

4. A pivot pin according to claim 1, wherein, on the lateral side of said at least one recess:
    the circumferential groove has, away from said at least one recess, at least one depth in a direction in which the circumferential groove extends towards the inside of the pivot pin, from a free lateral end of said cantilevered lateral portion to a bottom end of said circumferential groove, and
    the pivot pin having a circumference, said at least one recess extends over at least 10% of the circumference of the pivot pin and/or said depth of the circumferential groove.

5. A pivot pin according to claim 3, wherein, on the lateral side of said at least one recess:
    the circumferential groove has, away from said at least one recess, at least one depth in a direction in which the circumferential groove extends towards the inside of the pivot pin, from a free lateral end of said cantilevered lateral portion to a bottom end of said circumferential groove, and
    the pivot pin having a circumference, said at least one recess extends over at least 10% of the circumference of the pivot pin and/or said depth of the circumferential groove.

6. A pivot pin according to claim 1, characterized in that it comprises at least two recesses hollowed out respectively in one and the other of the two cantilevered lateral portions.

7. A pivot pin according to claim 3, characterized in that it comprises at least two recesses hollowed out respectively in one and the other of the two cantilevered lateral portions.

8. A pivot pin according to claim 4, characterized in that it comprises at least two recesses hollowed out respectively in one and the other of the two cantilevered lateral portions.

9. A planetary gear train of an aircraft gas turbine engine, comprising an outer ring gear and planet pinions meshing with a central pinion and with an outer ring gear and each mounted for free rotation on a planet carrier, each planet pinion being able to rotate about a planet axis matching one said axis of the axial passage, via a pivot pin according to claim 1.

10. A planetary gear train of an aircraft gas turbine engine, comprising an outer ring gear and planet pinions meshing with a central pinion and with an outer ring gear and each mounted for free rotation on a planet carrier, each planet pinion being able to rotate about a planet axis matching one said axis of the axial passage, via a pivot pin according to claim 3.

11. A planetary gear train of an aircraft gas turbine engine, comprising an outer ring gear and planet pinions meshing with a central pinion and with an outer ring gear and each mounted for free rotation on a planet carrier, each planet pinion being able to rotate about a planet axis matching one said axis of the axial passage, via a pivot pin according to claim 4.

12. A planetary gear train of an aircraft gas turbine engine, comprising an outer ring gear and planet pinions meshing with a central pinion and with an outer ring gear and each mounted for free rotation on a planet carrier, each planet pinion being able to rotate about a planet axis matching one said axis of the axial passage, via a pivot pin according to claim 5.

13. A planetary gear train according to claim 9, further comprising means for supplying oil at an interface between one of said planet pinions and said pivot pin, characterised in that said pivot pin has a radially outer circumferential surface which has a passage for supplying a lubricating liquid, said at least one recess being adjacent to the passage and being angularly located on the side opposite that towards which the lubricant flows on the radially outer circumferential surface when the gear train is allowed to rotate.

14. An aircraft gas turbine engine comprising said planetary gear train according to claim 9, the central pinion of which surrounds and is solidarized in rotation with a shaft of a compressor of the turbine engine.

15. A turbine engine according to claim 14, wherein the outer ring is solidarized with a casing or static annular shell of a low-pressure compressor.

16. A turbine engine according to claim 14, wherein the planet carrier is solidarized with a casing or a static annular shell.

17. A method for making a pivot pin according to claim 1, an outer circumferential surface of said pivot pin having a supply slot for a lubricating liquid, so that the liquid flows on a circumferential side of said outer circumferential surface when it exits the supply slot, wherein:

temperature fields of the pivot pin are determined by a TEHD model at least at the location of at least one of the cantilevered lateral portions, at least one zone is identified at this location that the TEHD model indicates as the highest temperature zone(s), and then a recess is created at the location of said area in said at least one cantilevered lateral portion.

18. A method for making a pivot pin according to claim 3, an outer circumferential surface of said pivot pin having a supply slot for a lubricating liquid, so that the liquid flows on a circumferential side of said outer circumferential surface when it exits the supply slot, wherein:

temperature fields of the pivot pin are determined by a TEHD model at least at the location of at least one of the cantilevered lateral portions, at least one zone is identified at this location that the TEHD model indicates as the highest temperature zone(s), and then a recess is created at the location of said area in said at least one cantilevered lateral portion.

19. A pivot pin for a planetary gear sliding bearing, the pivot pin having:

a portion forming a central shank extending around an axial passage of the pivot pin having an axis, and axially opposed circumferential grooves, which are open laterally and which radially separate two axially opposed lateral end portions of the central shank from two axially opposite lateral cantilevered portions of the pivot pin, characterised in that at least one of the cantilevered lateral portions is hollowed out by at least one recess, on the lateral side of said at least one recess, said lateral cantilevered portion is circumferential but not annular, and, on the lateral side of said at least one recess:

the circumferential groove has, away from said at least one recess, at least one depth in a direction in which the circumferential groove extends towards the inside of the pivot pin, from a free lateral end of said cantilevered lateral portion to a bottom end of said circumferential groove, and the pivot pin having a circumference, said at least one recess extends over at least 10% of the circumference of the pivot pin and/or said depth of the circumferential groove.

* * * * *